Inventor
Joachim Kolbe
By
Attorney

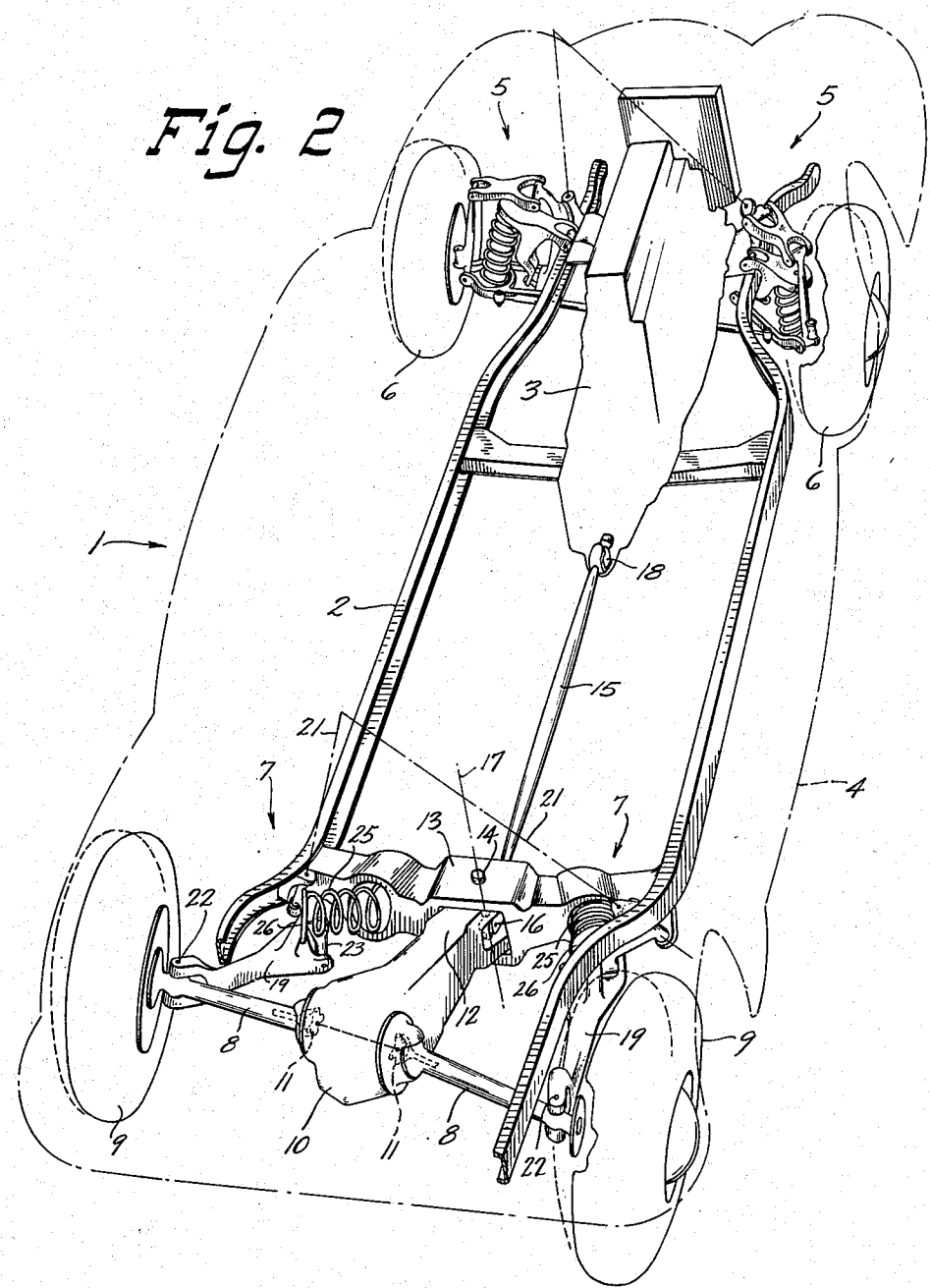

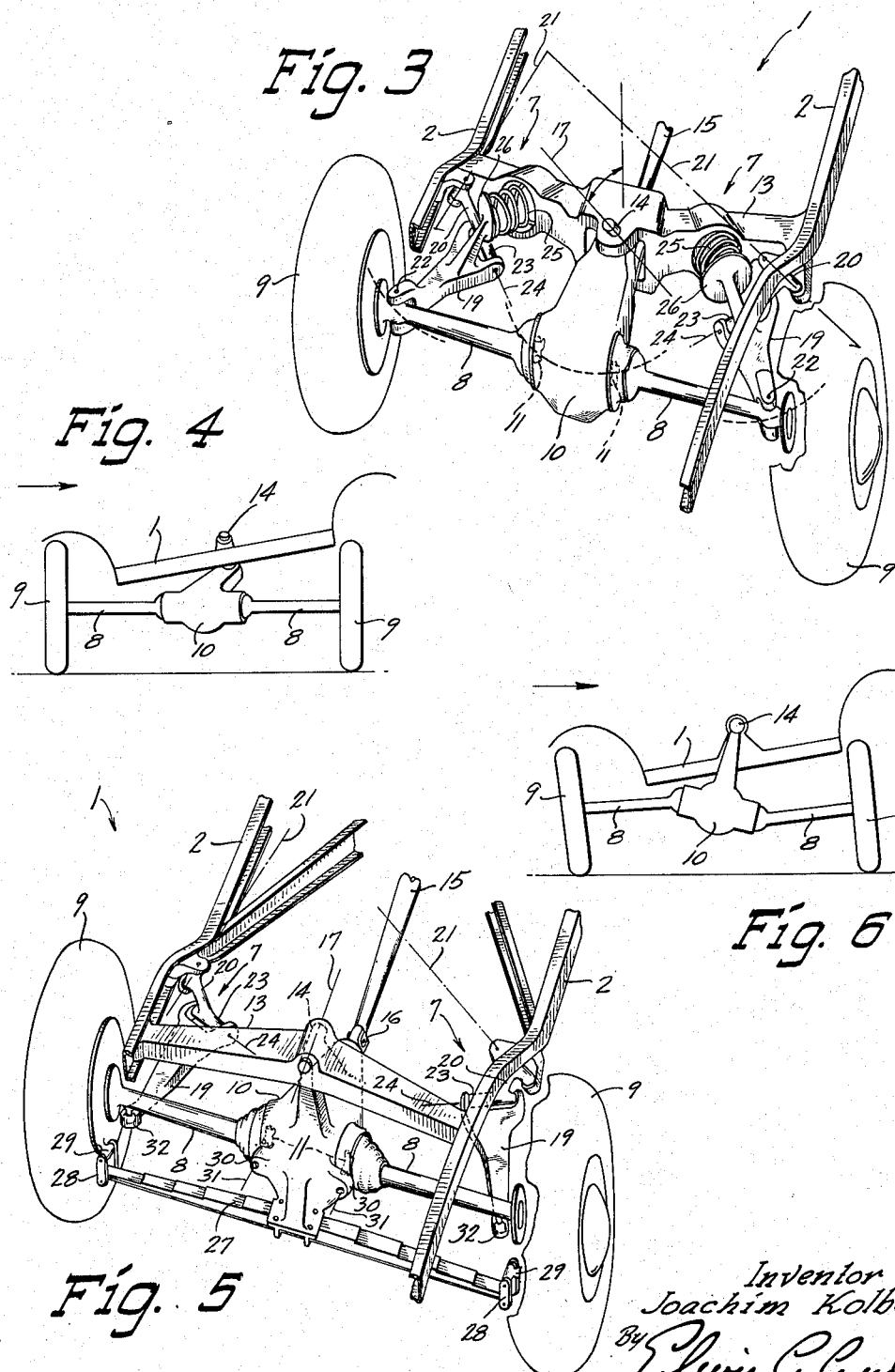

Patented Nov. 24, 1953

2,660,254

UNITED STATES PATENT OFFICE 2,660,254

INWARD BANKING VEHICLE WITH COMBINED BANKING ARM AND PENDULUM AXLE CONSTRUCTION

Joachim Kolbe, Milwaukee, Wis.

Application August 18, 1947, Serial No. 769,161

24 Claims. (Cl. 180—54)

This invention relates to an automobile or other self-propelled vehicle having at least one pair of drive wheels which are usually non-steerable.

The invention is particularly applicable to the construction of passenger automobiles having four wheels, the front pair of wheels constituting the steering wheels and the rear pair of wheels constituting the drive wheels.

In the conventional American car, heretofore, the rear drive wheels have been connected by a rigid rear axle housing which contained the differential, connected to the engine by a longitudinal drive shaft. The unsprung mass of such a construction has always been a problem in auto design for riding comfort.

In many European cars, heretofore, where a smaller vertical wheel oscillation is generally considered permissible, a pendulum axle construction has been employed wherein each rear drive wheel and its corresponding axle housing member is hinged to the differential housing and the latter is secured to the superstructure of the car. Various forms of pendulum axle constructions have been employed. The angular movement involved in this type of construction between the differential and the axles has always been a problem. Furthermore, different loads effect a different wheel position and the wheels tend to change in tread width and angularity under different road conditions.

One of the principal objects of the present invention is to change a substantial part of the unsprung weight of the rear axle assembly to sprung weight attached to the superstructure, and at the same time control the wheel position so as to reduce any change in tread width and in angular position.

Another object of the invention is to provide a car of the pendulum axle type in which the lateral movement of the center of gravity of the superstructure on curves is controlled and utilized to effect an inward banking of the superstructure.

Another object is to provide a car in which all four wheels are independently mounted, including the rear drive wheels, and in which the wheel position is controlled by a mechanism providing inward banking of the superstructure on curves, whereby a smaller vertical oscillation of any wheel relative to the superstructure gives the same effect as a large vertical oscillation for former constructions, so that a given softness of ride may be obtained with less actual vertical wheel oscillation.

Another object is to adapt the pendulum axle construction to American cars without reducing the softness of ride and without objectionable changes in tread width and wheel position.

Another object is to improve the control of the wheel position in pendulum axle constructions.

Another object is to improve the control of the lateral movement of the center of gravity of the superstructure in pendulum axle constructions.

Another object is to provide a construction for counterbanking cars in which the wheel position is controlled during banking to require less fender space, thereby enabling the design of cars having less total width than for rigid axle banking cars.

Another object is to provide for an increased rear seat width for counterbanking cars.

Another object is to provide an inward banking vehicle having a lower center of gravity.

Another object is to eliminate the sub-steering tendency in pendulum axle cars.

Another object is to eliminate the side sway and vertical oscillation of the drive shaft, present in American cars, and to provide a structure in which the floor of the car may be lower.

Another object is to compensate for angular movement of one pendulum axle with respect to the other pendulum axle and the superstructure during vertical oscillation.

Other objects and advantages of the invention are set forth hereinafter.

The invention combines the principles of pendulum axle construction with those of banking arm structures by providing a swinging differential carried by the superstructure and which does not interfere with either the banking action or the vertical oscillation of the wheels. The pendulum axle construction may be any of the various forms of construction embodying rigid wheel and axle assemblies angularly movable relative to the differential. The inward banking structure may be of the banking arm type, such, for instance, as that set forth in copending application Serial No. 724,062, filed January 24, 1947, issued to Patent No. 2,576,686, on November 27, 1951, and the earlier copending application Serial No. 522,269, filed February 14, 1944, and abandoned on March 2, 1949, by the present inventor, said earlier application filed February 14, 1944, constituting in effect a continuation in part of the application Serial No. 374,872, filed January 17, 1941, and issued to Patent No. 2,341,726 on February 15, 1944.

The invention may utilize the principles of dual spring operation as applied to banking arm structures, as set forth in copending application Serial No. 742,496, filed April 19, 1947, by the present inventor.

The principles of the present invention are illustrated in the accompanying drawings in which:

Fig. 2 is a view similar to Fig. 1 showing the car in a banked position on a turn;

Fig. 3 is an enlarged perspective rear end view of a car construction similar to that of Fig. 1, but in which the differential swings on an inclined pivot;

Fig. 4 is a schematic end elevation of the construction of Fig. 3 showing the parts in banking position on a curve;

Fig. 5 is a view similar to Fig. 3 in which leaf springs are employed and the differential swings on a substantially horizontal pivot;

Fig. 6 is a schematic end elevation of the construction of Fig. 5 showing the parts in banking position on a curve;

Various constructions may be employed utilizing the principles illustrated.

Figure 1:
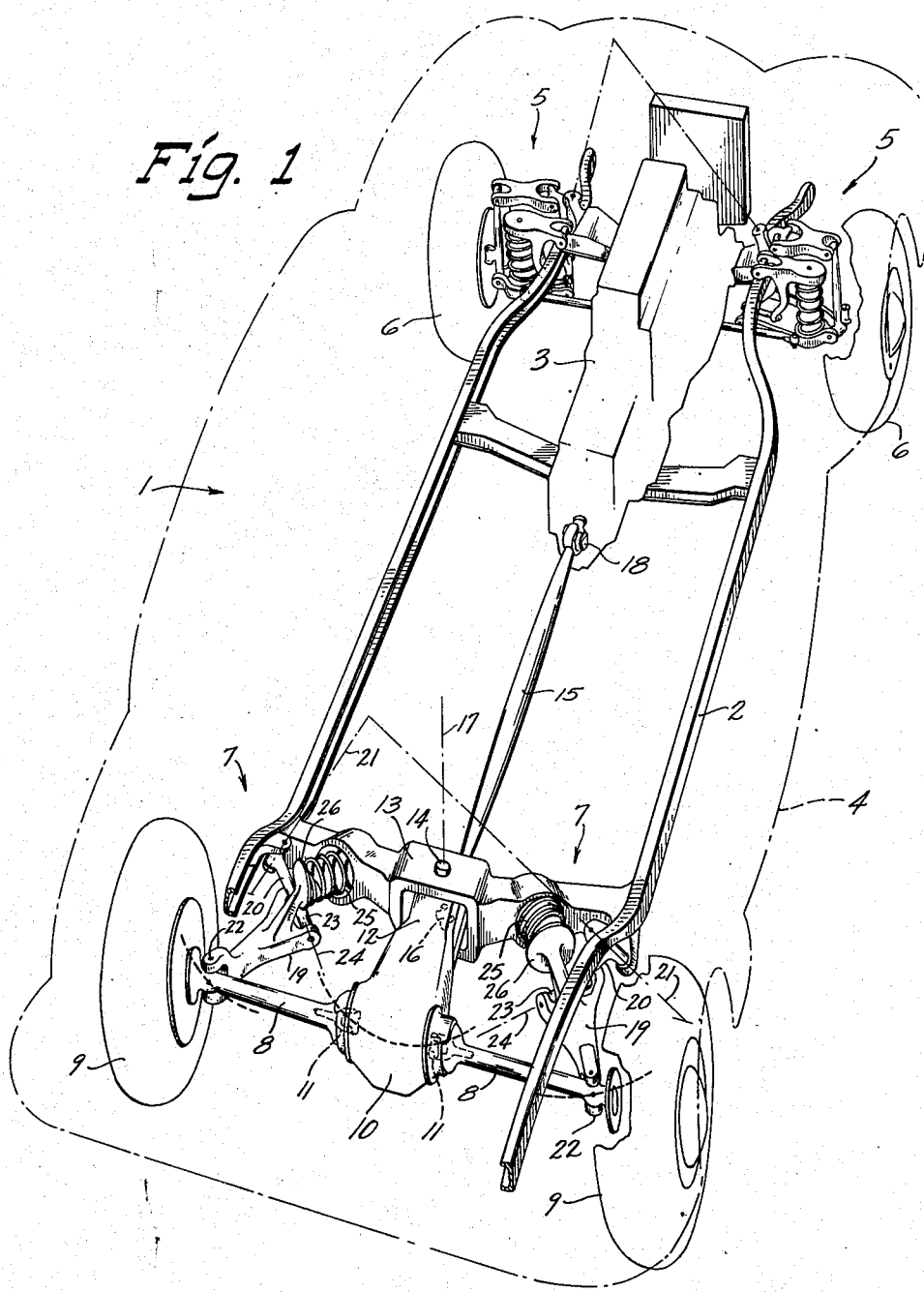
Figure 1 is a perspective view, partially schematic, of a car embodying the invention and in which the differential swings on a substantially vertical pivot.

In the construction illustrated in Figs. 1 and 2 the superstructure 1 is shown as having the usual frame 2, engine 3 and car body 4.

The forward end of the superstructure 1 is supported on a pair of banking arms 5 having the road wheels 6 at their outer ends.

The rear end of the superstructure 1 is supported by a pair of banking arms 7 disposed between the frame 2 and the road and which include the pendulum axle housings 8 and the corresponding wheels 9. The rear wheels 9 support the outer ends of the pendulum axle housings 8.

The inner ends of the pendulum axle housings 8 are secured to the corresponding opposite sides of the differential housing 10 by suitable pivotal joints illustrated as ball and socket enclosed universal joints 11.

The differential housing 10 and its contents are carried by the superstructure 1 in a manner to allow the differential to remain intermediate the wheels 9 while the superstructure 1 moves laterally into a banked position. For this purpose, the differential housing 10 of Figs. 1 and 2 is constructed with a forward extension 12 which is pivoted to a frame cross-member 13 by a pivot bearing 14 having a vertical axis. The drive shaft 15 extending rearwardly from the transmission for engine 3 to differential 10 has a universal joint 16 therein at or near the axis 17 of pivot joint 14 to provide for swinging of the differential.

In the construction of Fig. 3 the axis 17 of pivot joint 14 is inclined at an angle from the vertical. In the construction of Fig. 5 the joint 14 is above housing 10 and the axis 17 of the joint is horizontal. In this latter construction universal joint 16 is retained in shaft 15 near the differential 10 and the drive shaft 15 has to have an additional universal joint 18 disposed at its forward end to allow the shaft to swing laterally with the differential housing 10, while vertical oscillation of the shaft is eliminated.

The positioning of pivot joint 14 and of its axis 17 determines to a substantial extent the control of the angular movement of wheels 9 during vertical oscillation and during banking of the superstructure.

Where the axis 17 of pivot 14 is disposed vertically, as shown in Figs. 1 and 2, the wheels 9 tend to tilt outwardly on curves, and a greater seat width and a smaller fender space is made possible for the wheels for a given inward banking movement of the superstructure, than where the axis is horizontal.

Where the axis 17 of joint 14 is horizontal and parallel to the longitudinal axis of superstructure 1, as shown in Fig. 5, the wheels 9 tend to tilt inwardly on curves, and a greater fender space is required for the wheels for a given inward banking movement of the superstructure. However, such cars may have increased safety against skidding.

Where the axis 17 of the joint 14 is inclined at a selected angle of about 45°, as shown in Fig. 3, the wheels 9 remain substantially vertical during banking of the superstructure on curves.

Any desired control of the wheels 9 may be obtained by selectively determining the angle of the axis 17 of pivot joint 14.

The construction of each banking arm 7 for Figs. 1 and 2 embodies an arm 19 pivoted at its inner end to the superstructure 1 by a hinge joint 20 providing a pivotal banking axis 21 for the banking arm. The outer end of each banking arm 7 is the road contact point between the tire of the corresponding wheel and the road.

The outer end of arm 19 is pivoted to the corresponding axle housing 8 by forked pivotal joint 22 having a vertical axis and serving to resist the brake forces.

Each arm 19 is articulated and has a pivotal joint 23 therein disposed substantially horizontally for vertical oscillation of the corresponding wheel 9 relative to the superstructure. The axis 24 of joint 23 should pass substantially through the center of universal joint 11 to provide freedom of vertical oscillation for the corresponding wheel regardless of the position of differential housing 10 relative to the superstructure, to thereby reduce the turn about the banking hinge during oscillation to a minimum.

A coil spring 25 may be disposed between frame cross-member 13 and an upstanding arm 26 on the outer vertical oscillation part of arm 19, to resist vertical oscillation of the wheel 9 relative to the superstructure and also turning movement at banking axis 21, as set forth in copending application Serial No. 742,496, referred to above.

The positioning of banking axes 21, including their inclination and position relative to wheels 9, determines the banking effect obtainable on curves, and should be correlated to the banking arms 5 of the front mounting to provide the desired inward banking for the superstructure on curves. In banking, the center of mass of superstructure 1 moves laterally toward the outside of the curve and the lowermost parts of the superstructure move outwardly the most, so that the superstructure is in effect tilted or banked inwardly on the turn.

In order to provide freedom of lateral movement for the under parts of the superstructure, the invention provides a floating action for the differential 10 relative to the superstructure, as by the pivotal joint 14, referred to, or by some equivalent means.

Where the pivotal axis 17 of joint 14 is vertical, the distance between axis 17 and the center of each universal joint 11 should be substantially the same as the distance between the corresponding banking axis 21 and the pivot joint 22 of the corresponding banking arm and should constitute radii bearing substantially the same relation to the corresponding axis, as indicated by the curved broken lines passing through the respective joints 11 and 22, in order that lateral movement of the superstructure relative to the wheels on curves does not produce sub-steering in the wheels.

With axis 17 vertical, the differential housing 10 tilts or banks in the same direction as the superstructure 1 counterbanks on a curve and effects raising of the joint 11 on the outside of the curve and lowering of the joint 11 on the inside of the curve, thereby causing the wheels 9 to incline outwardly of the curve, as previously described.

Where the axis 17 is horizontal, the differential housing 10 tilts in a direction opposite to the direction of counterbanking of the superstructure on a curve, and effects lowering of the joint 11 on the outside of the curve and raising of the joint 11 on the inside of the curve, thereby causing the wheels 9 to incline inwardly of the curve, as previously described.

Inclination of axis 17 may be utilized to maintain differential housing 10 substantially horizontal as it floats or swings relative to the superstructure during counterbanking of the latter on a curve, thereby maintaining the wheels 9 substantially perpendicular at all times.

The banking arm construction of Figs. 3 and 4 is substantially the same as that of Figs. 1 and 2.

The banking arm construction of Figs. 5 and 6 differs from that of Figs. 1 to 4 by the substitution of a leaf spring 27 for the coil spring 25. Any suitable resilient means may be employed for controlling the banking arms, as explained in the copending applications referred to above.

In Figs. 5 and 6 leaf spring 27 is secured centrally to differential housing 10 and has its opposite ends connected by shackles 28 to corresponding brackets 29 on the outer ends of the corresponding pendulum axle housings 8 or on the adjacent brake drums. The pendulum axle housings 8 are hinged at their inner ends to the differential housing 10 by hinges 30 extending parallel to axis 17 on corresponding horizontal axis 31. The arms 19 are secured to the outer ends of housings 8 by ball and socket joints 32 in place of the forked pivotal joints of the constructions of Figs. 1 to 4.

In Fig. 5 the height of axis 17 of pivot 14 above differential housing 10 determines the amount and direction of tilting of the housing as the superstructure 1 moves laterally during banking. In general this height is limited by space requirements. Where the pivot 14 can be located adjacent the back of the rear seat of the car, a substantial height can be obtained for the pivot, thereby reducing the tilting of housing 10 for a given banking action of superstructure 1.

The pivot 14 in the construction shown in Fig. 5 should be constructed to provide for a small shifting of the differential housing 10 longitudinally of the superstructure during banking, to thereby compensate for the pivotal action of the banking arms. Likewise the drive shaft 15 should be constructed to provide for the longitudinal shifting of the differential.

Figure 7:
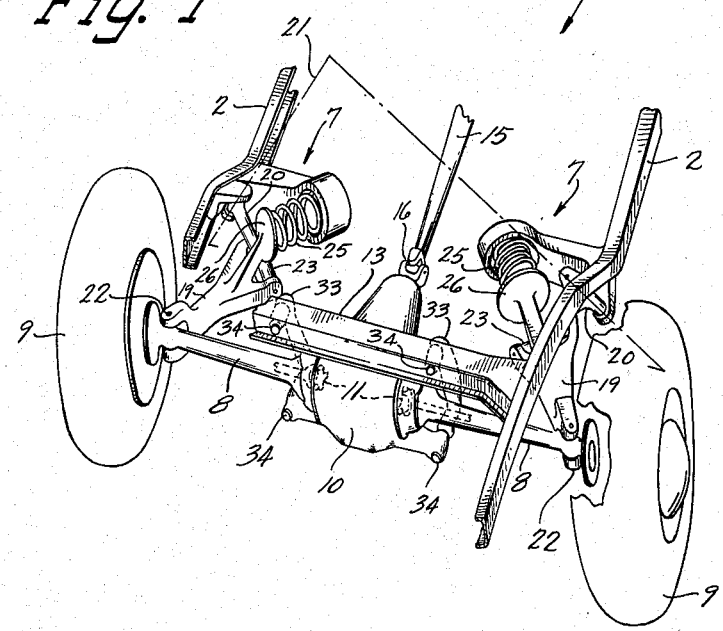
Fig. 7 is a view similar to Fig. 3 in which the swinging of the differential is guided by links providing a substantially horizontal pivot at infinity.
Figure 8:
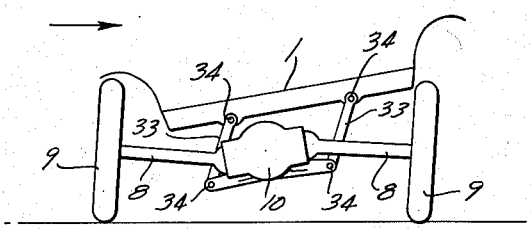
Fig. 8 is a schematic end elevation of the construction of Fig. 7 showing the parts in banking position on a curve.

Figs. 7 and 8 illustrate a construction utilizing coil springs and in which the effective horizontal axis 17 has been raised substantially to infinity, thereby causing the differential housing 10 to tilt inwardly on curves substantially the same as the inward banking of the superstructure.

This is accomplished by suspending the differential housing 10 from the superstructure by a pair of links 33 shown as substantially vertical, on opposite sides of the housing. The links 33 are pivoted to the cross-member 13 of frame 2 and to housing 10 by pivotal joints 34 having horizontal axes substantially parallel to the longitudinal axis of the superstructure and providing for longitudinal shifting of the housing 10 during banking.

The banking arms 7 are employed to effect inward banking of the superstructure on turns and provide for vertical oscillation of the wheels.

The links 33 are shown parallel and in this position they maintain housing 10 substantially parallel to the superstructure at all times, similar to the construction of Figs. 1 and 2.

Where links 33 are made to diverge downwardly, the housing 10 may be maintained substantially parallel to the road, similar to the construction of Fig. 5, or to tilt in an opposite direction to the banking direction of the superstructure, similar to the construction of Fig. 3, depending upon the degree of divergence.

In all of the constructions employing banking arms and with universal joints connecting the pendulum axles to the differential, the vertical oscillation of the wheels 9 is effected on the horizontal axis 24 which extends angularly in a direction generally transverse to the car, thereby modifying the pendulum action obtained to provide a forward and rearward component of movement for the wheel during vertical oscillation.

In all of the constructions of the invention, the maximum vertical oscillation of the wheels required for a given softness of ride is substantially less than that heretofore required. The inward banking suspension for all four wheels of the car enables a waving action of the superstructure relative to the road and vice versa, even without provision for separate vertical oscillation of the wheels and which transmits vertical oscillations from one wheel more directly to the wheel diagonally opposite thereto, whereby less total vertical oscillation of the wheel relative to the superstructure is obtained. By reason of the smaller vertical oscillation required for a given softness of ride with the banking vehicle described, it is possible to utilize the pendulum axle construction and obtain a softness of a ride comparable to American car designs without requiring an angular movement for the axles during vertical wheel oscillation that is greater than that employed for pendulum axles in European car designs. This fact makes practical the adaptation of pendulum axle construction to American cars.

The inclination of the banking axes 21 should be correlated to the floating mounting for differential 10 to effect the desired banking action without interference from the tie between the differential and superstructure.

The differential and pendulum axles constitute a tie rod made up of a central support and two laterally extending guide rods interconnecting the banking arms 7 which compels cooperation in the banking movements for the two arms 7.

The invention is applicable to pendulum axle constructions for both front and rear wheels and for both drive and non-drive wheels. It is also applicable to both steerable and non-steerable wheels.

Various embodiments of the invention may be

I claim:

1. In a vehicle having a superstructure adapted to bank inwardly on turns and a plurality of pairs of wheels for supporting the same, the combination for at least one pair of said wheels of pendulum axles and correlated banking arms connected to the superstructure and disposed to provide for independent vertical oscillation of the wheels relative to the superstructure and for lateral movement of the superstructure relative to the wheels during banking, the outer ends of said pendulum axles constituting respectively part of the corresponding banking arms, means carried by the superstructure and universally connected to said pendulum axles to guide the same during vertical oscillation of the wheels and also during actuation of said banking arms, and wheel carriers for the other wheels supporting said superstructure to effect inward banking of the superstructure on curves in correlation to the action of said banking arms.

2. In a vehicle having a superstructure and a pair of drive wheels driven from a differential, the combination of a non-extensible pendulum axle suspension for the drive wheels and of a banking arm support for the superstructure to effect inward banking thereof on turns, the outer ends of the pendulum axles of said suspension constituting a part of the corresponding banking arms and the inner ends of the pendulum axles being universally secured to said differential, and means to suspend the differential from the superstructure to provide for relative lateral movement of the same during actuation of said banking arms, whereby a softer ride may be obtained for a given angular movement of the pendulum axles.

3. In a vehicle having a superstructure, an inward banking suspension for said superstructure including a plurality of pairs of wheels for supporting the same, the combination for at least one pair of wheels of non-extensible pendulum axles having their inner ends tied together, correlated banking arms having the outer ends of the corresponding pendulum axles incorporated therein, and means disposed to shift the inner ends of said pendulum axles laterally relative to the superstructure to guide the same during actuation of said banking arms.

4. In a vehicle having an inward superstructure, a banking suspension for said superstructure including a plurality of pairs of wheels for supporting the same, the combination for at least one pair of wheels of non-extensible pendulum axles having their inner ends tied together, correlated banking arms having the outer ends of the corresponding pendulum axles incorporated therein, and means disposed to shift the inner ends of said pendulum axles laterally relative to the superstructure and to shift said inner ends vertically relative to each other to control the position of the wheels during movement of said banking arms relative to the superstructure.

5. In a vehicle having a superstructure, a banking suspension for said superstructure including a plurality of pairs of wheels for supporting the same to effect inward banking of the superstructure on turns, the combination for at least one pair of wheels of non-extensible pendulum axles, correlated banking arms having the outer ends of the corresponding pendulum axles incorporated therein, and a support for the inner ends of said pendulum axles universally connected to said axles in correlation to the banking arms to effect a control of the wheels both during vertical oscillation and during banking, said support being carried by the superstructure and disposed to shift laterally relative thereto during banking.

6. In a vehicle having a superstructure, a banking suspension for said superstructure including a plurality of pairs of wheels for supporting the same to effect inward banking of the superstructure on turns, the combination for at least one pair of wheels of non-extensible pendulum axles, correlated banking arms having the outer ends of the corresponding pendulum axles incorporated therein and providing for both vertical oscillation of the wheels and banking of the superstructure, and a support for the inner ends of said pendulum axles universally connected to said axles in correlation to the banking arms to effect a control of the wheels both during vertical oscillation and during banking, said support being carried by the superstructure and disposed to shift laterally relative thereto during banking, and to tilt relative to the superstructure to control the position of the wheels during banking.

7. In a vehicle, a superstructure, a pair of laterally spaced drive wheels therefor, a pair of steerable wheels therefor spaced forwardly of said drive wheels, banking arm suspensions pivotally connected to said superstructure and including said wheels to effect inward banking of the superstructure on turns and provide a spring suspension for the superstructure, a differential disposed centrally between said drive wheels and connected to said superstructure as a part of the sprung weight of the vehicle, and a pendulum axle for driving each drive wheel from said differential, the connection between said differential and the superstructure providing for free relative lateral movement therebetween, whereby said banking arms control the relative lateral position of said wheels and superstructure at all times.

8. In a vehicle, a superstructure constituting the sprung weight of the vehicle, a plurality of pairs of wheels for supporting the same, at least one of said pairs of wheels constituting the drive wheels therefor, a spring cushioned banking arm suspension including said wheels and disposed between the superstructure and the road support for said wheels whereby lateral movement of the superstructure in response to centrifugal forces on turns effects inward banking of the superstructure, a differential disposed between said pair of drive wheels and constituting a part of the sprung weight along with said superstructure, and a non-extensible pendulum axle extending universally from said differential to each of said drive wheels of said pair to drive the same, the outer end of each pendulum axle constituting a part of the corresponding banking arm, and said differential and superstructure being connected to move relative to each other in correlation to the movement of said banking arms during banking of the superstructure.

9. In a vehicle having a superstructure, a plurality of pairs of wheels for supporting the same and a banking suspension including said wheels to effect inward banking of the superstructure on turns, the combination for at least one pair of wheels of non-extensible pendulum axles, correlated banking arms having the outer ends of the corresponding pendulum axles incorporated therein, a support for the inner ends of said pendulum axles universally connected to said axles in correlation to the banking arms to effect a control of the wheels both during vertical oscillation and during banking, and a connection between said support and the superstructure having an effective pivotal axis spaced substantially from the connections between the support and pendulum axles to provide for relative movement between said latter connections and the superstructure in correlation to the movement of said banking arms during banking of the superstructure.

10. In a vehicle, a superstructure, a plurality of pairs of wheels for supporting the same, at least one of said pairs of wheels constituting the drive wheels therefor, a banking arm including a corresponding drive wheel disposed between the effective road contact point for each wheel and the superstructure to support the latter for inward banking on turns, a differential disposed between said pair of drive wheels, a pendulum axle extending universally from said differential to each of said drive wheels of said pair, and a connection between said differential and superstructure with the effective pivotal axis thereof substantially vertical and spaced substantially from the differential whereby lateral movement of the superstructure during banking effects a corresponding lateral movement of the upper part of the wheels to reduce space requirements between the superstructure and wheels.

11. In a vehicle having a superstructure, a plurality of pairs of wheels for supporting the same and a banking suspension including said wheels to effect inward banking of the superstructure on turns, the combination for at least one pair of wheels of pendulum axles, correlated banking arms, a support for the inner ends of said pendulum axles universally connected to said axles in correlation to the banking arms to effect a control of the wheels both during vertical oscillation and during banking, and an effective pivotal connection between said support and the superstructure with the pivotal axis thereof spaced vertically above the connections between the support and said pendulum axles and extending substantially horizontally longitudinally of the vehicle whereby lateral movement of the superstructure during banking effects a tilting of the support in a direction to effect inward tilting of the wheels on a turn.

12. In a vehicle, a superstructure, a plurality of pairs of wheels for supporting the same, at least one of said pairs of wheels constituting the drive wheels therefor, a banking arm disposed between the effective road contact point for each wheel and the superstructure to support the latter for inward banking on turns, a differential disposed between said pair of drive wheels, a pendulum axle extending universally from said differential to each of said drive wheels of said pair, and a pivotal connection between said differential and superstructure with the effective pivotal axis of the connection spaced vertically above said differential and extending substantially horizontally longitudinally of the vehicle whereby lateral movement of the superstructure during banking effects a tilting of the differential in a direction to effect inward tilting of the wheels on a turn.

13. In a vehicle, a superstructure, a plurality of pairs of wheels for supporting the same, at least one of said pairs of wheels constituting the drive wheels therefor, a banking arm disposed between the effective road contact point for each wheel and the superstructure to support the latter for inward banking on turns, a differential disposed between said pair of drive wheels, a pendulum axle extending universally from said differential to each of said drive wheels of said pair, and a pivotal connection between said differential and superstructure with the effective pivotal axis thereof spaced from the differential and disposed to control the movement of the differential and the wheels relative to the superstructure as the superstructure moves laterally during banking.

14. In a vehicle, a superstructure, a plurality of pairs of laterally spaced wheels therefor, banking suspensions including said wheels to effect inward banking of the superstructure on turns, pendulum axles for at least one pair of wheels to provide for relative vertical oscillation between the wheels and the superstructure, a support for the inner ends of said pendulum axles, and a connection between said support and the superstructure having an effective pivotal axis extending substantially vertically and spaced longitudinally of the vehicle from the inner ends of said pendulum axles to provide for the floating of said support and a predetermined control of the pendulum axles during banking.

15. In a vehicle, a superstructure, a plurality of pairs of wheels for supporting the same, at least one of said pairs of wheels constituting the drive wheels therefor, a banking arm disposed between the effective road contact point for each wheel and the superstructure to support the latter for inward banking on turns, a differential disposed between said pair of drive wheels, a pendulum axle extending universally pivotally from said differential to each of said drive wheels of said pair, and a pivotal connection between said differential and superstructure with the effective pivotal axis thereof extending substantially vertical and spaced longitudinally of the vehicle from the center of the differential, the banking axis for each banking arm being spaced from the connection between the pendulum axle and said banking arm in direction and amount substantially corresponding to the spacing of said pivotal axis between the differential and superstructure from the connection of the corresponding pendulum axle with the differential to avoid sub-steering of the wheels during banking of the superstructure.

16. In a vehicle, a superstructure, a plurality of pairs of laterally spaced wheels therefor, banking suspensions including said wheels to effect inward banking of the superstructure on turns, pendulum axles for at least one pair of wheels to provide for relative vertical oscillation between the wheels and the superstructure, a support for the inner ends of said pendulum axles, and a connection between said support and the superstructure having an effective pivotal axis disposed in the longitudinal central vertical plane of the superstructure and inclined upwardly toward the transverse central vertical plane of the wheels to cooperate with said banking suspensions in maintaining the wheels substantially upright during lateral movement and banking of the superstructure on turns.

17. In a vehicle of the class described, a superstructure, a plurality of pairs of wheels for supporting the same, at least one of said pairs of wheels constituting the drive wheels therefor, a banking arm disposed between the effective road contact point for each wheel and the superstructure to support the latter for inward banking on turns, a differential disposed between said pair of drive wheels, a pendulum axle extending universally pivotally from said differential to each of said drive wheels of said pair, and a pivotal connection between said differential and superstructure with the pivotal axis thereof inclined upwardly and passing above the differential from a position forwardly thereof to maintain the differential substantially level and the wheels substantially upright during lateral movement and banking of the superstructure on turns.

18. In a vehicle of the class described, a superstructure, a plurality of pairs of wheels for supporting the same at least one of which constitutes the drive wheels therefor, banking arms including said wheels for supporting the superstructure and to effect inward banking of the superstructure in response to lateral movement thereof effected by centrifugal forces on turns, a differential disposed between said pair of drive wheels, a pendulum axle extending universally from said differential to each of said drive wheels of said pair with the outer end of each pendulum axle constituting a part of the corresponding banking arm, and means suspending said differential from said superstructure with an effective pivotal axis spaced substantially above said differential to control the position of the differential and wheels during banking movement of the superstructure.

19. In a vehicle, a superstructure, front and rear paired wheels therefor, generally longitudinally extending paired wheel guiding means, pivoted connecting means in intersecting planes between the wheel guiding means of each pair and the superstructure whereby the superstructure may assume an angular inclined position when subjected to lateral forces in a direction against said forces, resilient means to absorb vertical shock to which the wheels are subjected and to maintain the superstructure in a substantially upright position until subjected to predetermined lateral forces, substantially non-extensible pendulum axles for at least one pair of said wheels, and laterally floating means carried by said superstructure and connected to the inner ends of said pendulum axles to guide the latter during vertical oscillation of the wheels and during banking of the superstructure.

20. In a vehicle having a superstructure and wheels supporting the same, resilient cushion means disposed to provide for vertical wheel oscillation relative to the superstructure, a leverage system disposed to operate said cushion means by both vertical forces and lateral forces on the superstructure whereby the lateral forces operate to actuate the cushion means on turns in a manner to prevent outward tilting of the superstructure, substantially non-extensible pendulum axles for at least one pair of said wheels, and laterally floating means carried by said superstructure and connected to the inner ends of said pendulum axles to guide the latter during operation of said cushion means.

21. In a motor vehicle, a superstructure, a pair of wheels at each end of said superstructure, the wheels at the front end being steerable and those at the rear end constituting drive wheels, means including said wheels for effecting inward banking of said superstructure on turns, an engine disposed at the forward end of said superstructure and carried thereby, a differential disposed between said drive wheels and pivotally carried by said superstructure for movement relative to the superstructure correlated with the banking movement of the superstructure, drive connections between said differential and drive wheels, and a longitudinal drive shaft disposed between said engine and differential and having its ends carried by said superstructure, the rear end of said shaft being disposed substantially at the pivotal axis between the superstructure and differential.

22. A vehicle comprising a superstructure, a plurality of pairs of interconnected banking arms supporting said superstructure for inward banking movement in response to lateral movement of the superstructure relative to the wheels on curves, the interconnection for at least one of said pairs of banking arms comprising a guide rod carrying a corresponding wheel and extending inwardly from the corresponding banking arm toward the longitudinal vertical central plane of the vehicle, and a laterally floating support for the inner ends of said guide rods carried by the superstructure.

23. A vehicle comprising a superstructure, a plurality of pairs of interconnected banking arms supporting said superstructure for inward banking movement in response to lateral movement of the superstructure relative to the wheels on curves, at least one of said pairs of banking arms including a pair of road wheels at the outer ends thereof, and the interconnection for said last named banking arms comprising a guide rod extending inwardly from each banking arm in line with the axis of the corresponding wheel, and a laterally floating common support for the inner ends of said guide rods carried by the superstructure.

24. A vehicle comprising a superstructure, a plurality of pairs of interconnected banking arms supporting said superstructure for inward banking movement in response to lateral movement of the superstructure relative to the wheels on curves, at least one of said pairs of banking arms including a pair of road wheels at the outer ends thereof, and the interconnection for said last named banking arms comprising a guide rod extending inwardly from each banking arm in line with the axis of the corresponding wheel, and a laterally floating common support for the inner ends of said guide rods carried by the superstructure, said common support being pivotally connected to the superstructure to govern movement of said guide rods in correlation to the action of said banking arms.

JOACHIM KOLBE.

References Cited in the file of this patent

UNITED STATES PATENTS

| Number | Name | Date |
|---|---|---|
| Re. 21,605 | Kolbe | Oct. 22, 1940 |
| 2,015,700 | Wagner | Oct. 1, 1935 |
| 2,203,056 | Kolbe | June 4, 1940 |
| 2,341,726 | Kolbe | Feb. 15, 1944 |

FOREIGN PATENTS

| Number | Country | Date |
|---|---|---|
| 512,296 | Germany | Nov. 8, 1930 |